(12) United States Patent
Barnes et al.

(10) Patent No.: US 9,371,470 B2
(45) Date of Patent: Jun. 21, 2016

(54) TWO PART-CYANOACRYLATE/FREE RADICALLY CURABLE ADJESIVE SYSTEMS

(71) Applicants: Rory B. Barnes, Dublin (IE); Barry N. Burns, Killiney (IE); Jonathan P. Wigham, Rathfarnham (IE); Rachel M. Hersee, Drimnagh (IE); Emer Ward, Dublin (IE)

(72) Inventors: Rory B. Barnes, Dublin (IE); Barry N. Burns, Killiney (IE); Jonathan P. Wigham, Rathfarnham (IE); Rachel M. Hersee, Drimnagh (IE); Emer Ward, Dublin (IE)

(73) Assignee: Henkel IP & Holding GmbH, Duesseldorf (DE)

( * ) Notice: Subject to any disclaimer, the term of this patent is extended or adjusted under 35 U.S.C. 154(b) by 0 days.

(21) Appl. No.: 14/333,921

(22) Filed: Jul. 17, 2014

(65) Prior Publication Data
US 2014/0329959 A1    Nov. 6, 2014

Related U.S. Application Data

(63) Continuation of application No. PCT/IB2013/050373, filed on Jan. 15, 2013.

(60) Provisional application No. 61/589,466, filed on Jan. 23, 2012.

(51) Int. Cl.
*C09J 4/06* (2006.01)
*C09J 4/00* (2006.01)

(52) U.S. Cl.
CPC ..... *C09J 4/06* (2013.01); *C09J 4/00* (2013.01)

(58) Field of Classification Search
CPC .................................. C09J 4/06; C09J 4/00
USPC ............... 524/553, 555; 526/298; 525/289
See application file for complete search history.

(56) References Cited

U.S. PATENT DOCUMENTS

| | | | |
|---|---|---|---|
| 3,183,217 A | | 5/1965 | Serniuk et al. |
| 3,963,772 A | | 6/1976 | Takeshita |
| 4,440,910 A | | 4/1984 | O'Connor |
| 4,560,723 A | * | 12/1985 | Millet et al. ............. 524/486 |
| 5,340,873 A | * | 8/1994 | Mitry ....................... 525/10 |
| 5,994,464 A | | 11/1999 | Ohsawa et al. |
| 6,562,181 B2 | * | 5/2003 | Righettini ............. 156/331.6 |
| 6,833,196 B1 | | 12/2004 | Wojciak |
| 6,906,112 B1 | | 6/2005 | Wojciak et al. |
| 2002/0066686 A1 | * | 6/2002 | Montenieri et al. ........ 206/365 |
| 2002/0129896 A1 | | 9/2002 | Righettini |

FOREIGN PATENT DOCUMENTS

| | | | |
|---|---|---|---|
| CN | 101156798 A | | 4/2008 |
| CN | 101679709 A | | 3/2010 |
| JP | 56095966 A | * | 8/1981 |
| JP | S5695966 A | | 8/1981 |
| JP | 2007217484 A | | 8/2007 |

OTHER PUBLICATIONS

International Search Report for PCT/IB2013/050373, 1 page.

* cited by examiner

*Primary Examiner* — Michael M Bernshteyn
(74) *Attorney, Agent, or Firm* — Steven C. Bauman

(57) ABSTRACT

Two part cyanoacrylate/free radical curable adhesive systems, are provided.

13 Claims, 5 Drawing Sheets

TWO PART-CYANOACRYLATE/FREE RADICALLY CURABLE ADJESIVE SYSTEMS

BACKGROUND

1. Field

Two part cyanoacrylate/free radically curable adhesive systems are provided.

2. Brief Discussion of Related Technology

Curable compositions such as cyanoacrylate adhesives are well recognized for their excellent ability to rapidly bond a wide range of substrates, generally in a number of minutes and depending on the particular substrate, often in a number of seconds.

Polymerization of cyanoacrylates is initiated by nucleophiles found under normal atmospheric conditions on most surfaces. The initiation by surface chemistry means that sufficient initiating species are available when two surfaces are in close contact with a small layer of cyanoacrylate between the two surfaces. Under these conditions a strong bond is obtained in a short period of time. Thus, in essence the cyanoacrylate often functions as an instant adhesive.

Cyanoacrylate adhesive performance, particularly durability, oftentimes becomes suspect when exposed to elevated temperature conditions and/or high relative humidity conditions. To combat these application-dependent shortcomings, a host of additives have been identified for inclusion in cyanoacrylate adhesive formulations. Improvements would still be seen as beneficial.

A variety of additives and fillers have been added to cyanoacrylate compositions to modify physical properties.

For instance, U.S. Pat. No. 3,183,217 to Serniuk et al. discloses free radical polymerization of a methacrylic acid or methyl methacrylate monomer with a non-polar or mildly polar olefin where the monomer is complexed with a Friedel-Crafts halide.

U.S. Pat. No. 3,963,772 to Takeshita discloses liquid telomers of alkylene and acrylic monomers which result in short chain alternating copolymers substantially terminated at one end of the polymer chains with the more reactive alkylene units. The liquid telomers are useful in making elastomeric polymers for high molecular weight rubbers which permit the ready incorporation of fillers, additives, and the like, due to its liquid phase.

U.S. Pat. No. 4,440,910 to O'Connor is directed to cyanoacrylate compositions having improved toughness, achieved through the addition of elastomers, i.e., acrylic rubbers. These rubbers are either (i) homopolymers of alkyl esters of acrylic acid; (ii) copolymers of another polymerizable monomer, such as lower alkenes, with an alkyl ester of acrylic acid or with an alkoxy ester of acrylic acid; (iii) copolymers of alkyl esters of acrylic acid; (iv) copolymers of alkoxy esters of acrylic acid; and (v) mixtures thereof.

U.S. Pat. No. 4,560,723 to Millet et al. discloses a cyanoacrylate adhesive composition containing a toughening agent comprising a core-shell polymer and a sustainer comprising an organic compound containing one or more unsubstituted or substituted aryl groups. The sustainer is reported to improve retention of toughness after heat aging of cured bonds of the adhesive. The core-shell polymer is treated with an acid wash to remove any polymerization-causing impurities such as salts, soaps or other nucleophilic species left over from the core-shell polymer manufacturing process.

U.S. Pat. No. 5,340,873 to Mitry discloses a cyanoacrylate adhesive composition having improved toughness by including an effective toughening amount of a polyester polymer derived from a dibasic aliphatic or aromatic carboxylic acid and a glycol.

U.S. Pat. No. 5,994,464 to Ohsawa et al. discloses a cyanoacrylate adhesive composition containing a cyanoacrylate monomer, an elastomer miscible or compatible with the cyanoacrylate monomer, and a core-shell polymer being compatible, but not miscible, with the cyanoacrylate monomer.

U.S. Pat. No. 6,833,196 to Wojciak discloses a method of enhancing the toughness of a cyanoacrylate composition between steel and EPDM rubber substrates. The disclosed method is defined by the steps of: providing a cyanoacrylate component; and providing a toughening agent comprising methyl methacrylic monomer and at least one of butyl acrylic monomer and isobornyl acrylic monomer, whereby the acrylic monomer toughening agent enhances the toughness of the cyanoacrylate composition such that whereupon cure, the cyanoacrylate composition has an average tensile shear strength of over about 4400 psi after 72 hours at room temperature cure and 2 hours post cure at 121° C.

Reactive acrylic adhesives that cure by free radical polymerization of (meth)acrylic esters (i.e., acrylates) are known, but suffer from certain drawbacks. Commercially important acrylic adhesives tend to have an offensive odor, particularly those that are made from methyl methacrylate. Methyl methacrylate-based acrylic adhesives also have low flash points (approximately 59° F.). Low flash points are particularly an issue during storage and transportation of the adhesives. If the flash point is 141° F. or lower, the U.S. Department of Transportation classifies the product as "Flammable" and requires marking and special storage and transportation conditions.

U.S. Pat. No. 6,562,181 intended to provide a solution to the problem addressed in the preceding paragraph by describing an adhesive composition comprising: (a) a trifunctional olefinic first monomer comprising an olefinic group that has at least three functional groups each bonded directly to the unsaturated carbon atoms of said olefinic group; (b) an olefinic second monomer that is copolymerizable with the first monomer; (c) a redox initiator system, and (d) a reactive diluent, where the composition is a liquid at room temperature is 100% reactive and substantially free of volatile organic solvent, and is curable at room temperature.

Notwithstanding the state of the art, it would be desirable to provide an adhesive system having both the features of an instant adhesive, such as in terms of the fast fixture times and ability to bond a wide range of substrates such as metals and plastics observed with cyanoacrylates, together with the improved bond strength over a greater variety and/or selection of substrates seen with (meth)acrylate compositions. And it would be desirable to provide a two part reactive adhesive with reduced odor and flammability that could be mixed at a 1:1 volume ratio without comprising shelf life stability or adhesive performance.

SUMMARY

There is provided in one aspect a two part cyanoacrylate/free radically curable composition comprising:
(a) a first part comprising a cyanoacrylate component and a peroxide catalyst; and
(b) a second part comprising a free radical curable component, such as a (meth)acrylate component, maleimide-, itaconamide- or nadimide-containing compounds, and a transition metal.
When mixed together the peroxide catalyst of the first part initiates cure of the free radically curable component of the second part and the transition metal of the second part initiates cure of the cyanoacrylate of the first part.

The compositions, which are room temperature curable as the first part and the second part do not interact prior to use on mixing, provide good performance across substrates constructed from a wide variety of materials and provide improved durability performance over conventional cyanoacrylate compositions and improved fixture time and improved bond strength over conventional free radical curable compositions.

DETAILED DESCRIPTION

Part A

Figure 1:
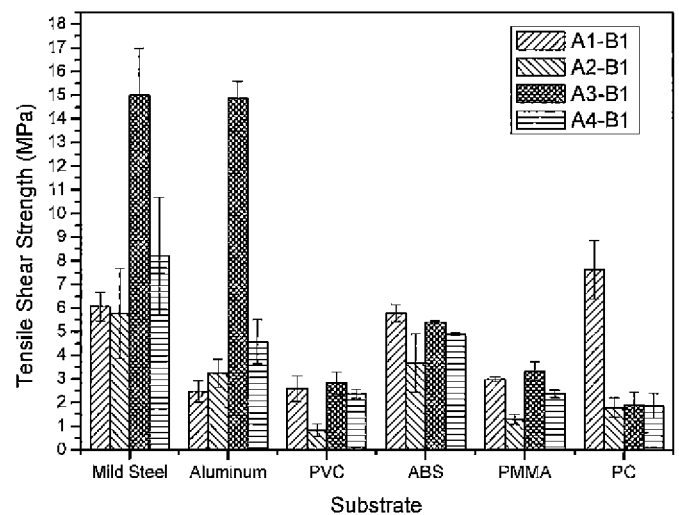
FIGS. 1-9 depict bar charts of various adhesive systems used to bond metal (i.e., grit blasted mild steel and aluminium) and plastic (i.e., PVC, ABS, PMMA or PC) substrates, with performance measured in MPas and shown on the Y axis.

The cyanoacrylate component includes cyanoacrylate monomers, such as those represented by $H_2C=C(CN)-COOR$, where R is selected from $C_{1-15}$ alkyl, $C_{2-15}$ alkoxyalkyl, $C_{3-15}$ cycloalkyl, $C_{2-15}$ alkenyl, $C_{7-15}$ aralkyl, $C_{6-15}$ aryl, $C_{3-15}$ allyl and $C_{1-15}$ haloalkyl groups. Desirably, the cyanoacrylate monomer is selected from methyl cyanoacrylate, ethyl-2-cyanoacrylate ("ECA"), propyl cyanoacrylates, butyl cyanoacrylates (such as n-butyl-2-cyanoacrylate), octyl cyanoacrylates, allyl cyanoacrylate, β-methoxyethyl cyanoacrylate and combinations thereof. A particularly desirable one is ethyl-2-cyanoacrylate.

The cyanoacrylate component should be included in the Part A composition in an amount within the range of from about 50 weight percent to about 99.98 weight percent, such as about 90 weight percent to about 99 weight percent being desirable, and about 92 weight percent to about 97 weight percent of the Part A composition being particularly desirable.

As the peroxide catalyst to be included in the Part A composition of the two part adhesive system, perbenzoates should be used, such as t-butylperbenzoate.

Typically, the amount of peroxide catalyst should fall in the range of about 0.001 weight percent up to about 10.00 weight percent of the composition, desirably about 0.01 weight percent up to about 5.00 weight percent of the composition, such as about 0.50 to 2.50 weight percent of the composition.

Additives may be included in the Part A composition of the adhesive system to modify physical properties, such as improved fixture speed, improved shelf-life stability, flexibility, thixotropy, increased viscosity, color, and improved toughness. Such additives therefore may be selected from accelerators, free radical stabilizers, anionic stabilizers, gelling agents, thickeners [such as PMMAs], thixotropy conferring agents (such as fumed silica), dyes, toughening agents, plasticizers and combinations thereof.

One or more accelerators may also be used in the adhesive system, particularly, in the Part A composition, to accelerate cure of the cyanoacrylate component. Such accelerators may be selected from calixarenes and oxacalixarenes, silacrowns, crown ethers, cyclodextrins, poly(ethyleneglycol) di(meth)acrylates, ethoxylated hydric compounds and combinations thereof.

Of the calixarenes and oxacalixarenes, many are known, and are reported in the patent literature. See e.g. U.S. Pat. Nos. 4,556,700, 4,622,414, 4,636,539, 4,695,615, 4,718,966, and 4,855,461, the disclosures of each of which are hereby expressly incorporated herein by reference.

For instance, as regards calixarenes, those within the structure below are useful herein:

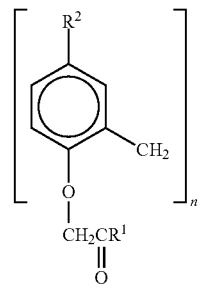

where $R^1$ is alkyl, alkoxy, substituted alkyl or substituted alkoxy; $R^2$ is H or alkyl; and n is 4, 6 or 8.

One particularly desirable calixarene is tetrabutyl tetra[2-ethoxy-2-oxoethoxy]calix-4-arene.

A host of crown ethers are known. For instance, examples which may be used herein either individually or in combination include 15-crown-5, 18-crown-6, dibenzo-18-crown-6, benzo-15-crown-5-dibenzo-24-crown-8, dibenzo-30-crown-10, tribenzo-18-crown-6, asym-dibenzo-22-crown-6, dibenzo-14-crown-4, dicyclohexyl-18-crown-6, dicyclohexyl-24-crown-8, cyclohexyl-12-crown-4, 1,2-decalyl-15-crown-5, 1,2-naphtho-15-crown-5, 3,4,5-naphtyl-16-crown-5, 1,2-methyl-benzo-18-crown-6, 1,2-methylbenzo-5,6-methylbenzo-18-crown-6, 1,2-t-butyl-18-crown-6, 1,2-vinylbenzo-15-crown-5, 1,2-vinylbenzo-18-crown-6, 1,2-t-butyl-cyclohexyl-18-crown-6, asym-dibenzo-22-crown-6 and 1,2-benzo-1,4-benzo-5-oxygen-20-crown-7. See U.S. Pat. No. 4,837,260 (Sato), the disclosure of which is hereby expressly incorporated here by reference.

Of the silacrowns, again many are known, and are reported in the literature. For instance, a typical silacrown may be represented within the structure below:

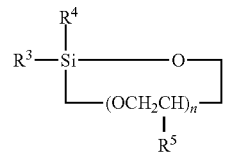

where $R^3$ and $R^4$ are organo groups which do not themselves cause polymerization of the cyanoacrylate monomer, $R^5$ is H or $CH_3$ and n is an integer of between 1 and 4. Examples of suitable $R^3$ and $R^4$ groups are R groups, alkoxy groups, such as methoxy, and aryloxy groups, such as phenoxy. The $R^3$ and $R^4$ groups may contain halogen or other substituents, an example being trifluoropropyl. However, groups not suitable as $R^4$ and $R^5$ groups are basic groups, such as amino, substituted amino and alkylamino.

Specific examples of silacrown compounds useful in the inventive compositions include:

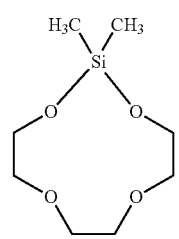

dimethylsila-11-crown-4;

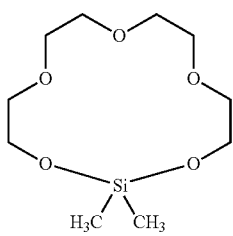 [SMILES: C[Si]1(C)OCCOCCOCCOCCO1]

dimethylsila-14-crown-5;

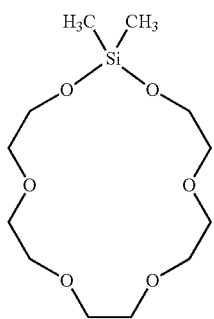 [SMILES: C[Si]1(C)OCCOCCOCCOCCOCCO1]

and dimethylsila-17-crown-6. See e.g. U.S. Pat. No. 4,906,317 (Liu), the disclosure of which is hereby expressly incorporated herein by reference.

Many cyclodextrins may be used in connection with the present invention. For instance, those described and claimed in U.S. Pat. No. 5,312,864 (Wenz), the disclosure of which is hereby expressly incorporated herein by reference, as hydroxyl group derivatives of an α, β or γ-cyclodextrin which is at least partly soluble in the cyanoacrylate would be appropriate choices for use herein as an accelerator component.

In addition, poly(ethylene glycol) di(meth)acrylates suitable for use herein include those within the structure below:

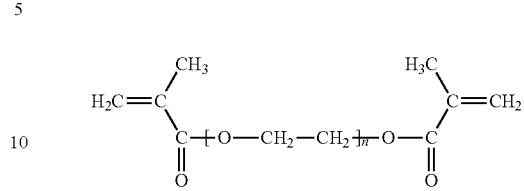

where n is greater than 3, such as within the range of 3 to 12, with n being 9 as particularly desirable. More specific examples include PEG 200 DMA (where n is about 4), PEG 400 DMA (where n is about 9), PEG 600 DMA (where n is about 14), and PEG 800 DMA (where n is about 19), where the number (e.g., 400) represents the average molecular weight of the glycol portion of the molecule, excluding the two methacrylate groups, expressed as grams/mole (i.e., 400 g/mol). A particularly desirable PEG DMA is PEG 400 DMA.

And of the ethoxylated hydric compounds (or ethoxylated fatty alcohols that may be employed), appropriate ones may be chosen from those within the structure below:

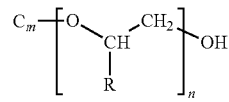

where $C_m$ can be a linear or branched alkyl or alkenyl chain, m is an integer between 1 to 30, such as from 5 to 20, n is an integer between 2 to 30, such as from 5 to 15, and R may be H or alkyl, such as $C_{1-6}$ alkyl.

In addition, accelerators embraced within the structure below:

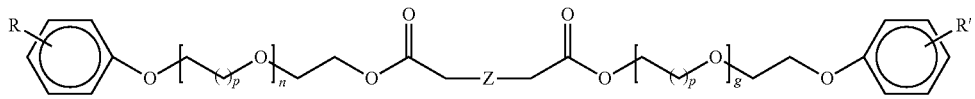

where R is hydrogen, $C_{1-6}$ alkyl, $C_{1-6}$ alkyloxy, alkyl thioethers, haloalkyl, carboxylic acid and esters thereof, sulfinic, sulfonic and sulfurous acids and esters, phosphinic, phosphonic and phosphorous acids and esters thereof, Z is a polyether linkage, n is 1-12 and p is 1-3 are as defined above, and R' is the same as R, and g is the same as n.

A particularly desirable chemical within this class as an accelerator component is

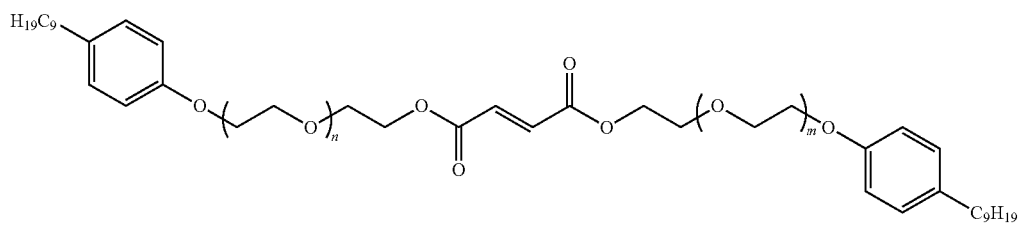

where n and m combined are greater than or equal to 12.

The accelerator should be included in the composition in an amount within the range of from about 0.01 weight percent to about 10 weight percent, with the range of about 0.1 to about 0.5 weight percent being desirable, and about 0.4 weight percent of the total composition being particularly desirable.

Stabilizers useful in the Part A composition of the adhesive system include free-radical stabilizers, anionic stabilizers and stabilizer packages that include combinations thereof. The identity and amount of such stabilizers are well known to those of ordinary skill in the art. See e.g. U.S. Pat. Nos. 5,530,037 and 6,607,632, the disclosures of each of which are hereby incorporated herein by reference. Commonly used free-radical stabilizers include hydroquinone, while commonly used anionic stabilizers include boron triflouride, boron trifluoride-etherate, sulphur trioxide (and hydrolysis products thereof) and methane sulfonic acid.

Part B

Free radical curable monomers for use in the Part B composition of the adhesive system include (meth)acrylate monomers, maleimide-, itaconamide- or nadimide-containing compounds and combinations thereof.

(Meth)acrylate monomers for use in Part B of the composition of the adhesive system include a host of (meth)acrylate monomers, with some of the (meth)acrylate monomers being aromatic, while others are aliphatic and still others are cycloaliphatic. Examples of such (meth)acrylate monomers include di- or tri-functional (meth)acrylates like polyethylene glycol di(meth)acrylates, tetrahydrofuran (meth)acrylates and di(meth)acrylates, hydroxypropyl (meth)acrylate ("HPMA"), hexanediol di(meth)acrylate, trimethylol propane tri(meth)acrylate ("TMPTMA"), diethylene glycol dimethacrylate, triethylene glycol dimethacrylate ("TRIEGMA"), benzylmethacrylate, tetraethylene glycol dimethacrylate, dipropylene glycol dimethacrylate, di-(pentamethylene glycol) dimethacrylate, tetraethylene diglycol diacrylate, diglycerol tetramethacrylate, tetramethylene dimethacrylate, ethylene dimethacrylate, neopentyl glycol diacrylate, trimethylol propane triacrylate and bisphenol-A mono and di(meth)acrylates, such as ethoxylated bisphenol-A (meth)acrylate ("EBIPMA"), bisphenol-F mono and di(meth)acrylates, such as ethoxylated bisphenol-F (meth)acrylate, and methacrylate-functional urethanes.

The maleimides, nadimides, and itaconimides include those compounds having the following structures I, II and III, respectively

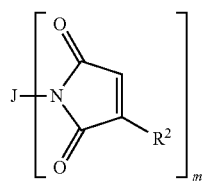

I

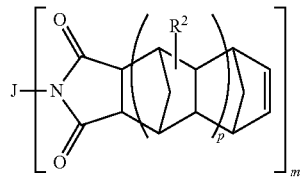

II

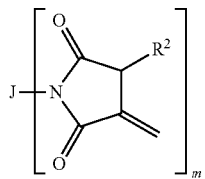

III where:
m=1-15,
p=0-15,
each $R^2$ is independently selected from hydrogen or lower alkyl, and
J is a monovalent or a polyvalent moiety comprising organic or organosiloxane radicals, and combinations of two or more thereof.

More specific representations of the maleimides, itaconimides and nadimides include those corresponding to structures I, II, or III, where m=1-6, p=0, $R^2$ is independently selected from hydrogen or lower alkyl, and J is a monovalent or polyvalent radical selected from hydrocarbyl, substituted hydrocarbyl, heteroatom-containing hydrocarbyl, substituted heteroatom-containing hydrocarbyl, hydrocarbylene, substituted hydrocarbylene, heteroatom-containing hydrocarbylene, substituted heteroatom-containing hydrocarbylene, polysiloxane, polysiloxane-polyurethane block copolymer, and combinations of two or more thereof, optionally containing one or more linkers selected from a covalent bond, —O—, —S—, —NR—, —O—C(O)—, —O—C(O)—O—, —O—C(O)—NR—, —NR—C(O)—, —NR—C(O)—O—, —NR—C(O)—NR—, —S—C(O)—, —S—C(O)—O—, —S—C(O)—NR—, —S(O)—, —S(O)$_2$—, —O—S(O)$_2$—, —O—S(O)$_2$—O—, —O—S(O)$_2$—NR—, —O—S(O)—, —O—S(O)—O—, —O—S(O)—NR—, —O—NR—C(O)—, —O—NR—C(O)—O—, —O—NR—C(O)—NR—, —NR—O—C(O)—, —NR—O—C(O)—O—, —NR—O—C(O)—NR—, —O—NR—C(S)—, —O—NR—C(S)—O—, —O—NR—C(S)—NR—, —NR—O—C(S)—, —NR—O—C(S)—O—, —NR—O—C(S)—NR—, —O—C(S)—, —O—C(S)—O—, —O—C(S)—NR—, —NR—C(S)—, —NR—C(S)—O—, —NR—C(S)—NR—, —S—S(O)$_2$—, —S—S(O)$_2$—O—, —S—S(O)$_2$—NR—, —NR—O—S(O)—, —NR—O—S(O)—O—, —NR—O—S(O)—NR—, —NR—O—S(O)$_2$—, —NR—O—S(O)$_2$—O—, —NR—O—S(O)$_2$—NR—, —O—NR—S(O)—, —O—NR—S(O)—O—, —O—NR—S(O)—NR—, —O—NR—S(O)$_2$—O—, —O—NR—S(O)$_2$—NR—, —O—NR—S(O)$_2$—, —O—P(O)R$_2$—, —S—P(O)R$_2$—, —NR—P(O)R$_2$—, where each R is independently hydrogen, alkyl or substituted alkyl, and combinations of any two or more thereof.

When one or more of the above described monovalent or polyvalent groups contain one or more of the above described linkers to form the "J" appendage of a maleimide, nadimide or itaconimide group, as readily recognized by those of skill in the art, a wide variety of linkers can be produced, such as, for example, oxyalkyl, thioalkyl, aminoalkyl, carboxylalkyl, oxyalkenyl, thioalkenyl, aminoalkenyl, carboxyalkenyl, oxyalkynyl, thioalkynyl, aminoalkynyl, carboxyalkynyl, oxycycloalkyl, thiocycloalkyl, aminocycloalkyl, carboxycycloalkyl, oxycloalkenyl, thiocycloalkenyl, aminocycloalkenyl, carboxycycloalkenyl, heterocyclic, oxyheterocyclic, thioheterocyclic, aminoheterocyclic, carboxyheterocyclic, oxyaryl, thioaryl, aminoaryl, carboxyaryl, heteroaryl, oxyheteroaryl, thioheteroaryl, aminoheteroaryl, carboxyheteroaryl, oxyalkylaryl, thioalkylaryl, aminoalkylaryl, carboxyalkylaryl, oxyarylalkyl, thioarylalkyl, aminoarylalkyl, carboxyarylalkyl, oxyarylalkenyl, thioarylalkenyl, aminoarylalkenyl, carboxyarylalkenyl, oxyalkenylaryl, thioalkenylaryl, aminoalkenylaryl, carboxyalkenylaryl, oxyarylalkynyl, thioarylalkynyl, aminoarylalkynyl, carboxyarylalkynyl, oxyalkynylaryl, thioalkynylaryl, aminoalkynylaryl or carboxyalkynylaryl, oxyalkylene, thioalkylene, aminoalkylene, carboxyalkylene, oxyalkenylene, thioalkenylene, aminoalkenylene, carboxyalkenylene, oxyalkynylene, thioalkynylene, aminoalkynylene, carboxyalkynylene, oxycycloalkylene, thiocycloalkylene, aminocycloalkylene, carboxycycloalkylene, oxycycloalkenylene, thiocycloalkenyle aminoalkylarylene, carboxyalkylarylene, oxyarylalkylene, thioarylalkylene, aminoarylalkylene, carboxyarylalkylene, oxyarylalkenylene, thioarylalkenylene, aminoarylalkenylene, carboxyarylalkenylene, oxyalkenylarylene, thioalkenylarylene, aminoalkenylarylene, carboxyalkenylarylene, oxyarylalkynylene, thioarylalkynylene, aminoarylalkynylene, carboxy arylalkynylene, oxyalkynylarylene, thioalkynylarylene, aminoalkynylarylene, carboxyalkynylarylene, heteroarylene, oxyheteroarylene, thioheteroarylene, aminoheteroarylene, carboxyheteroarylene, heteroatom-containing di- or polyvalent cyclic moiety, oxyheteroatom-containing di- or polyvalent cyclic moiety, thioheteroatom-containing di- or polyvalent cyclic moiety, aminoheteroatom-containing di- or polyvalent cyclic moiety, carboxyheteroatom-containing di- or polyvalent cyclic moiety, disulfide, sulfonamide, and the like. ne, aminocycloalkenylene, carboxycycloalkenylene, oxyarylene, thioarylene, aminoarylene, carboxyarylene, oxyalkylarylene, thioalkylarylene, In another embodiment, maleimides, nadimides, and itaconimides contemplated for use in the practice of the present invention have the structures I, II, and III, where m=1-6, p=0-6, and J is selected from saturated straight chain alkyl or branched chain alkyl, optionally containing optionally substituted aryl moieties as substituents on the alkyl chain or as part of the backbone of the alkyl chain, and where the alkyl chains have up to about 20 carbon atoms;

a siloxane having the structure: $-(C(R^3)_2)_d-[Si(R^4)_2-O]_f-Si(R^4)_2-(C(R^3)_2)_e-$, $-(C(R^3)_2)_d-C(R^3)-C(O)O-(C(R^3)_2)_d-[Si(R^4)_2-O]_f-Si(R^4)_2-(C(R^3)_2)_e-O(O)C-(C(R^3)_2)_e-$, or $-(C(R^3)_2)_d-C(R^3)-O(O)C-(C(R^3)_2)_d-[Si(R^4)_2-O]_f-Si(R^4)_2-(C(R^3)_2)_e-C(O)O-(C(R^3)_2)_e-$, where:

each $R^3$ is independently hydrogen, alkyl or substituted alkyl, each $R^4$ is independently hydrogen, lower alkyl or aryl, d=1-10, e=1-10, and f=1-50;

a polyalkylene oxide having the structure:

$$-[(CR_2)_r-O-]_f-(CR_2)_s-$$

where:

each R is independently hydrogen, alkyl or substituted alkyl, r=1-10, s=1-10, and f is as defined above;

aromatic groups having the structure:

$$Ar-\overset{O}{\underset{\|}{C}}-O-Z-O-\overset{O}{\underset{\|}{C}}-Ar-$$

where:

each Ar is a monosubstituted, disubstituted or trisubstituted aromatic or heteroaromatic ring having in the range of 3 up to 10 carbon atoms, and Z is:

saturated straight chain alkylene or branched chain alkylene, optionally containing saturated cyclic moieties as substituents on the alkylene chain or as part of the backbone of the alkylene chain, or polyalkylene oxides having the structure:

$$-[(CR_2)_r-O-]_q-(CR_2)_s-$$

where:

each R is independently hydrogen, alkyl or substituted alkyl, r and s are each defined as above, and q falls in the range of 1 up to 50;

di- or tri-substituted aromatic moieties having the structure:

$$-(CH_2)_t-O-\overset{O}{\underset{\|}{C}}-Ar\left[\overset{O}{\underset{\|}{C}}-O-(CR_2)_u\right]_{1,2}-$$

where:

each R is independently hydrogen, alkyl or substituted alkyl, t falls in the range of 2 up to 10, u falls in the range of 2 up to 10, and Ar is as defined above;

aromatic groups having the structure:

$$-Ar+O(C)_{0,1}-(CR_2)_t]_k\ ,\quad -Ar-[(C)_{0,1}-O-(CR_2)_t]_k\ ,$$

$$Ar-E-\overset{O}{\underset{\|}{C}}-\underset{R}{N}-\ ,\quad Ar-E-\underset{R}{N}-\overset{O}{\underset{\|}{C}}-\ ,$$

$$W\!\left[\!\!+\!\overset{O}{\underset{\|}{C}}\!\!\!\xrightarrow{}_{0,1}\!\!O-Ar\!\right]_g\ \text{or}\ W\!\left[\!\!+\!O\!-\!\overset{O}{\underset{\|}{C}}\!\!\!\xrightarrow{}_{0,1}\!\!Ar\!\right]_g$$

where:

each R is independently hydrogen, alkyl or substituted alkyl, t=2-10, k=1, 2 or 3, g=1 up to about 50, each Ar is as defined above, E is —O— or —NR$^5$—, where R$^5$ is hydrogen or lower alkyl; and W is straight or branched chain alkyl, alkylene, oxyalkylene, alkenyl, alkenylene, oxyalkenylene, ester, or polyester, a siloxane having the structure $-(C(R^3)_2)_d-[Si(R^4)_2-O]_f-Si(R^4)_2-(C(R^3)_2)_e-$, $-(C(R^3)_2)_d-C(R^3)-C(O)O-(C(R^3)_2)_d-[Si(R^4)_2-O]_f-Si(R^4)_2-(C(R^3)_2)_e-O(O)$ C—(C(R³)₂)ₑ—,    or    —(C(R³)₂)_d—C(R³)—O(O)C—(C(R³)₂)_d—[Si(R⁴)₂—O]_f—Si(R⁴)₂—(C(R³)₂)ₑ—C(O)O—(C(R³)₂)ₑ—, where:

each R³ is independently hydrogen, alkyl or substituted alkyl,
each R⁴ is independently hydrogen, lower alkyl or aryl,
d=1-10,
e=1-10, and
f=1-50;
a polyalkylene oxide having the structure:

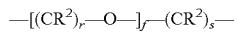

where:
each R is independently hydrogen, alkyl or substituted alkyl,
r=1-10,
s=1-10, and
f is as defined above;
optionally containing substituents selected from hydroxy, alkoxy, carboxy, nitrile, cycloalkyl or cycloalkenyl;
a urethane group having the structure:

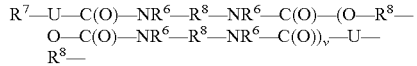

where:
each R⁶ is independently hydrogen or lower alkyl,
each R⁷ is independently an alkyl, aryl, or arylalkyl group having 1 to 18 carbon atoms,
each R⁸ is an alkyl or alkyloxy chain having up to about 100 atoms in the chain, optionally substituted with Ar,
U is —O—, —S—, —N(R)—, or —P(L)₁,₂-,
where R as defined above, and where each L is independently =O, =S, —OR or —R; and
v=0-50;
polycyclic alkenyl; or mixtures of any two or more thereof.

In a more specific recitation of such maleimide-, nadimide-, and itaconimide-containing compounds of structures I, II and III, respectively, each R is independently hydrogen or lower alkyl (such as C₁₋₄), -J- comprises a branched chain alkyl, alkylene, alkylene oxide, alkylene carboxyl or alkylene amido species having sufficient length and branching to render the maleimide, nadimide and/or itaconimide compound a liquid, and m is 1, 2 or 3.

Particularly desirable maleimide-containing compounds include those have two maleimide groups with an aromotaic group therebetween, such as a phenyl, biphenyl, bispheny or napthyl linkage.

In addition to the free radical curable component, Part B also includes a transition metal compound. A non-exhaustive list of representative examples of the transition metal compounds are copper, vanadium, cobalt and iron compounds. For instance, as regards copper compounds, copper compounds where copper enjoys a 1+or 2+ valence state are desirable. A non-exhaustive list of examples of such copper (I) and (II) compounds include copper (II) 3,5-diisopropylsalicylate hydrate, copper bis(2,2,6,6-tetramethyl-3,5-heptanedionate), copper (II) hydroxide phosphate, copper (II) chloride, copper (II) acetate monohydrate, tetrakis(acetonitrile)copper (I) hexafluorophosphate, copper (II) formate hydrate, tetrakisacetonitrile copper (I) triflate, copper(II)tetrafluoroborate, copper (II) perchlorate, tetrakis(acetonitrile) copper (I) tetrafluoroborate, copper (II) hydroxide, copper (II) hexafluoroacetylacetonate hydrate and copper (II) carbonate. These copper (I) and (II) compounds should be used in an amount such that when dissolved or suspended in a carrier vehicle, such as a (meth)acrylate, a concentration of about 100 ppm to about 5,000 ppm, such as about 500 ppm to about 2,500 ppm, for instance about 1,000 ppm is present in the solution or suspension.

As regards vanadium compounds, vanadium compounds where vanadium enjoys a 2+ and 3+ valence state are desirable. Examples of such vanadium (III) compounds include vanadyl naphthanate and vanadyl acetylacetonate. These vanadium (III) compounds should be used in an amount of 50 ppm to about 5,000 ppm, such as about 500 ppm to about 2,500 ppm, for instance about 1,000 ppm.

As regards cobalt compounds, cobalt compounds where cobalt enjoys a 2+ valence state are desirable. Examples of such cobalt (II) compounds include cobalt naphthenate, cobalt tetrafluoroborate and cobalt acetylacetonate. These cobalt (II) compounds should be used in an amount of about 100 ppm to about 1000 ppm.

As regards iron compounds, iron compounds where iron enjoys a 3+ valence state are desirable. Examples of such iron (III) compounds include iron acetate, iron acetylacetonate, iron tetrafluoroborate, iron perchlorate, and iron chloride. These iron compounds should be used in an amount of about 100 ppm to about 1000 ppm.

As discussed above, additives may be included in either or both of the Part A or the Part B compositions to influence a variety of performance properties.

Fillers contemplated for use include, for example, aluminum nitride, boron nitride, silicon carbide, diamond, graphite, beryllium oxide, magnesia, silicas, such as fumed silica or fused silica, alumina, perfluorinated hydrocarbon polymers (i.e., TEFLON), thermoplastic polymers, thermoplastic elastomers, mica, glass powder and the like. Preferably, the particle size of these fillers will be about 20 microns or less.

As regards silicas, the silica may have a mean particle diameter on the nanoparticle size; that is, having a mean particle diameter on the order of $10^{-9}$ meters. The silica nanoparticles can be pre-dispersed in epoxy resins, and may be selected from those available under the tradename NANOPOCRYL, from Nanoresins, Germany. NANOCRYL is a tradename for a product family of silica nanoparticle reinforced (meth)acrylates. The silica phase consists of surface-modified, synthetic $SiO_2$ nanospheres with less than 50 nm diameter and an extremely narrow particle size distribution. The $SiO_2$ nanospheres are agglomerate-free dispersions in the (meth)acrylate matrix resulting in a low viscosity for resins containing up to 50 weight percent silica.

The silica component should be present in an amount in the range of about 1 to about 60 weight percent, such as about 3 to about 30 weight percent, desirably about 5 to about 20 weight percent, based on the total weight of the composition.

Tougheners contemplated for use particularly in the Part A composition include elastomeric polymers selected from elastomeric copolymers of a lower alkene monomer and (i) acrylic acid esters, (ii) methacrylic acid esters or (iii) vinyl acetate, such as acrylic rubbers; polyester urethanes; ethylene-vinyl acetates; fluorinated rubbers; isoprene-acrylonitrile polymers; chlorosulfinated polyethylenes; and homopolymers of polyvinyl acetate were found to be particularly useful. [See U.S. Pat. No. 4,440,910 (O'Connor), the disclosures of each of which are hereby expressly incorporated herein by reference.] The elastomeric polymers are described in the '910 patent as either homopolymers of alkyl esters of acrylic acid; copolymers of another polymerizable monomer, such as lower alkenes, with an alkyl or alkoxy ester of acrylic acid; and copolymers of alkyl or alkoxy esters of acrylic acid. Other unsaturated monomers which may be copolymerized with the alkyl and alkoxy esters of acrylic include dienes, reactive halogen-containing unsaturated compounds and other acrylic monomers such as acrylamides.

For instance, one group of such elastomeric polymers are copolymers of methyl acrylate and ethylene, manufactured by DuPont, under the name of VAMAC, such as VAMAC N123 and VAMAC B-124. VAMAC N123 and VAMAC B-124 are reported by DuPont to be a master batch of ethylene/acrylic elastomer. The DuPont material VAMAC G is a similar copolymer, but contains no fillers to provide color or stabilizers. VAMAC VCS rubber appears to be the base rubber, from which the remaining members of the VAMAC product line are compounded. VAMAC VCS (also known as VAMAC MR) is a reaction product of the combination of ethylene, methyl acrylate and monomers having carboxylic acid cure sites, which once formed is then substantially free of processing aids (such as the release agents octadecyl amine, complex organic phosphate esters and/or stearic acid), and anti-oxidants (such as substituted diphenyl amine).

DuPont provides to the market under the trade designation VAMAC VMX 1012 and VCD 6200, rubbers which are made from ethylene and methyl acrylate. It is believed that the VAMAC VMX 1012 rubber possesses little to no carboxylic acid in the polymer backbone. Like the VAMAC VCS rubber, the VAMAC VMX 1012 and VCD 6200 rubbers are substantially free of processing aids such as the release agents octadecyl amine, complex organic phosphate esters and/or stearic acid, and anti-oxidants, such as substituted diphenyl amine, noted above. All of these VAMAC elastomeric polymers are useful herein.

In addition, vinylidene chloride-acrylonitrile copolymers [see U.S. Pat. No. 4,102,945 (Cleave)] and vinyl chloride/vinyl acetate copolymers [see U.S. Pat. No. 4,444,933 (Columbus)] may be included in the Part A composition. Of course, the disclosures of each these U.S. patents are hereby incorporated herein by reference in their entirety.

Copolymers of polyethylene and polyvinyl acetate, available commercially under the trade name LEVAMELT by LANXESS Limited, are useful.

A range of LEVAMELT-branded copolymers are available and includes for example, LEVAMELT 400, LEVAMELT 600 and LEVAMELT 900. The LEVAMELT products differ in the amount of vinyl acetate present. For example, LEVAMELT 400 comprises an ethylene-vinyl acetate copolymer comprising 40 weight percent vinyl acetate. The LEVAMELT products are supplied in granular form. The granules are almost colourless and dusted with silica and talc. LEVAMELT consists of methylene units forming a saturated main chain with pendant acetate groups. The presence of a fully saturated main chain is an indication that LEVAMELT-branded copolymers are particularly stable; they does not contain any reactive double bonds which make conventional rubbers prone to aging reactions, ozone and UV light. The saturated backbone is reported to make the polymer robust.

Interestingly, depending on the ratio of polyethylene/polyvinylacetate, the solubilities of these LEVAMELT elastomers change in different monomers and also the ability to toughen changes as a result of the solubility.

The LEVAMELT elastomers are available in pellet form and are easier to formulate than other known elastomeric toughening agents.

VINNOL surface coating resins available commercially from Wacker Chemie AG, Munich, Germany represent a broad range of vinyl chloride-derived copolymers and terpolymers that are promoted for use in different industrial applications. The main constituents of these polymers are different compositions of vinyl chloride and vinyl acetate. The terpolymers of the VINNOL product line additionally contain carboxyl or hydroxyl groups. These vinyl chloride/vinyl acetate copolymers and terpolymers may also be used.

VINNOL surface coating resins with carboxyl groups are terpolymers of vinyl chloride, vinyl acetate and dicarboxylic acids, varying in terms of their molar composition and degree and process of polymerization. These terpolymers are reported to show excellent adhesion, particularly on metallic substrates.

VINNOL surface coating resins with hydroxyl groups are copolymers and terpolymers of vinyl chloride, hydroxyacrylate and dicarboxylate, varying in terms of their composition and degree of polymerization.

VINNOL surface coating resins without functional groups are copolymers of vinyl chloride and vinyl acetate of variable molar composition and degree of polymerization.

Rubber particles, especially rubber particles that have relatively small average particle size (e.g., less than about 500 nm or less than about 200 nm), may also be included, particularly in the Part B composition. The rubber particles may or may not have a shell common to known core-shell structures.

In the case of rubber particles having a core-shell structure, such particles generally have a core comprised of a polymeric material having elastomeric or rubbery properties (i.e., a glass transition temperature less than about 0° C., e.g., less than about −30° C.) surrounded by a shell comprised of a non-elastomeric polymeric material (i.e., a thermoplastic or thermoset/crosslinked polymer having a glass transition temperature greater than ambient temperatures, e.g., greater than about 50° C.). For example, the core may be comprised of a diene homopolymer or copolymer (for example, a homopolymer of butadiene or isoprene, a copolymer of butadiene or isoprene with one or more ethylenically unsaturated monomers such as vinyl aromatic monomers, (meth)acrylonitrile, (meth)acrylates, or the like) while the shell may be comprised of a polymer or copolymer of one or more monomers such as (meth)acrylates (e.g., methyl methacrylate), vinyl aromatic monomers (e.g., styrene), vinyl cyanides (e.g., acrylonitrile), unsaturated acids and anhydrides (e.g., acrylic acid), (meth) acrylamides, and the like having a suitably high glass transition temperature. Other rubbery polymers may also be suitably be used for the core, including polybutylacrylate or polysiloxane elastomer (e.g., polydimethylsiloxane, particularly crosslinked polydimethylsiloxane).

Typically, the core will comprise from about 50 to about 95 weight percent of the rubber particles while the shell will comprise from about 5 to about 50 weight percent of the rubber particles.

Preferably, the rubber particles are relatively small in size. For example, the average particle size may be from about 0.03 to about 2 microns or from about 0.05 to about 1 micron. The rubber particles may have an average diameter of less than about 500 nm, such as less than about 200 nm. For example, the core-shell rubber particles may have an average diameter within the range of from about 25 to about 200 nm.

When used, these core shell rubbers allow for toughening to occur in the composition and oftentimes in a predictable manner—in terms of temperature neutrality toward cure—because of the substantial uniform dispersion, which is ordinarily observed in the core shell rubbers as they are offered for sale commercially.

In the case of those rubber particles that do not have such a shell, the rubber particles may be based on the core of such structures.

Desirably, the rubber particles are relatively small in size. For example, the average particle size may be from about 0.03 to about 2μ or from about 0.05 to about 1μ. In certain embodiments of the invention, the rubber particles have an average diameter of less than about 500 nm. In other embodiments, the average particle size is less than about 200 nm. For example, the rubber particles may have an average diameter within the range of from about 25 to about 200 nm or from about 50 to about 150 nm.

The rubber particles may be used in a dry form or may be dispersed in a matrix, as noted above.

Typically, the composition may contain from about 5 to about 35 weight percent rubber particles.

Combinations of different rubber particles may advantageously be used in the present invention. The rubber particles may differ, for example, in particle size, the glass transition temperatures of their respective materials, whether, to what extent and by what the materials are functionalized, and whether and how their surfaces are treated.

Rubber particles that are suitable for use in the present invention are available from commercial sources. For example, rubber particles supplied by Eliokem, Inc. may be used, such as NEP R0401 and NEP R401S (both based on acrylonitrile/butadiene copolymer); NEP R0501 (based on carboxylated acrylonitrile/butadiene copolymer; CAS No. 9010-81-5); NEP R0601A (based on hydroxy-terminated polydimethylsiloxane; CAS No. 70131-67-8); and NEP R0701 and NEP 0701S (based on butadiene/styrene/2-vinylpyridine copolymer; CAS No. 25053-48-9). Also those available under the PARALOID tradename, such as PARALOID 2314, PARALOID 2300, and PARALOID 2600, from Dow Chemical Co., Philadelphia, Pa., and those available under the STAPHYLOID tradename, such as STAPHYLOID AC-3832, from Ganz Chemical Co., Ltd., Osaka, Japan.

Rubber particles that have been treated with a reactive gas or other reagent to modify the outer surfaces of the particles by, for instance, creating polar groups (e.g., hydroxyl groups, carboxylic acid groups) on the particle surface, are also suitable for use herein. Illustrative reactive gases include, for example, ozone, $Cl_2$, $F_2$, $O_2$, $SO_3$, and oxidative gases. Methods of surface modifying rubber particles using such reagents are known in the art and are described, for example, in U.S. Pat. Nos. 5,382,635; 5,506,283; 5,693,714; and 5,969,053, each of which being hereby expressly incorporated herein by reference in its entirety. Suitable surface modified rubber particles are also available from commercial sources, such as the rubbers sold under the tradename VISTAMER by Exousia Corporation.

Where the rubber particles are initially provided in dry form, it may be advantageous to ensure that such particles are well dispersed in the adhesive composition prior to curing the adhesive composition. That is, agglomerates of the rubber particles are preferably broken up so as to provide discrete individual rubber particles, which may be accomplished by intimate and thorough mixing of the dry rubber particles with other components of the adhesive composition.

Thickeners are also useful.

Stabilizers and inhibitors may also be employed to control and prevent premature peroxide decomposition and polymerization. The inhibitors may be selected from hydroquinones, benzoquinones, naphthoquinones, phenanthroquinones, anthraquinones, and substituted compounds thereof. Various phenols may also be used as inhibitors, such as 2,6-di-tertiary-butyl-4-methyl phenol. The inhibitors may be used in quantities of about 0.1% to about 1.0% by weight of the total composition without adverse effect on the curing rate of the polymerizable adhesive composition.

At least one of the first part or the second part may also include an organic acid having a $pK_a$ of about 12 or less, such as sulfimides, sulfonamides, citric acid, maleic acid, succinic acid, phthalic acid, di-carboxylic acid, maleic anhydride, maleic dianhydride, succinic anhydride, and phthalic anhydride.

In practice, each of the Part A and the Part B compositions are housed in separate containment vessels in a device prior to use, where in use the two parts are expressed from the vessels mixed and applied onto a substrate surface. The vessels may be chambers of a dual chambered cartridge, where the separate parts are advanced through the chambers with plungers through an orifice (which may be a common one or adjacent ones) and then through a mixing dispense nozzle. Or the vessels may be coaxial or side-by-side pouches, which may be cut or torn and the contents thereof mixed and applied onto a substrate surface.

The invention will be more readily appreciated by a review of the examples, which follow.

EXAMPLES

Reference to CA or cyanoacrylate in the Examples refers to ECA or ethyl-2-cyanoacrylate, respectively, unless otherwise noted. S.d. stands for the standard derivation of the means value recorded. Each means value is the average of five replicate samples.

With reference to Table 1, four adhesive systems were prepared where the (meth)acrylate component was based on one or more of TRIEGMA, HPMA, and EBACRYL 1259 (the latter of which is the tradename given to an aliphatic urethane acrylate, as reported by the manufacturer, Cytec Industries Inc.), mixed with hydrated copper tetrafluorobate and the cyanoacrylate component was based on ECA, mixed with t-BPB together with boron trifluoride as a stabilizer.

TABLE 1

| Part A | | | | | |
|---|---|---|---|---|---|
| Components | | Sample/Amt (grams) | | | |
| Type | Identity | A1 | A2 | A3 | A4 |
| (Meth)acrylate | TRIEGMA | 99.0 | — | — | — |
| | HPMA | — | 99.0 | — | 44.5 |
| | EBECRYL 1259* | — | — | 99.0 | 44.5 |
| Transitional Metal | $Cu(BF_4)_2 \cdot H_2O$ | 1.0 | 1.0 | 1.0 | 1.0 |

| Part B | | |
|---|---|---|
| Components | | Sample/Amt (grams) |
| Type | Identity | B1 |
| Cyanoacrylate | ECA | 95.0 |
| Peroxide | t-BPB | 5.0 |
| Stabilizer | $BF_3$ | 50 ppm |

*Aliphatic urethane acrylate, as reported by the manufacturer, Cytec Industries Inc., of a molecular weight of about 2000 (diluted by 35% by weight HPMA to a viscosity at 25° C. of 12000).

With reference to Table 2, each of the four adhesive systems set forth in Table 1 was applied to the noted substrate which was mated in an overlapped, off-set manner with the adhesive system disposed between the substrates in the overlapped, off-set portion, and allowed to cure for 24 hours at room temperature. The tensile shear strength (in MPas) was observed and recorded.

TABLE 2

| | Sample | | | | | | | |
|---|---|---|---|---|---|---|---|---|
| | A1-B1 | | A2-B1 | | A3-B1 | | A4-B1 | |
| Substrate | mean | s.d. | mean | s.d. | mean | s.d. | mean | s.d. |
| Mild Steel | 6.05 | 0.61 | 5.77 | 1.91 | 15.00 | 1.97 | 8.20 | 2.48 |
| Aluminum | 2.47 | 0.46 | 3.23 | 0.60 | 14.87 | 0.70 | 4.57 | 0.94 |
| PVC | 2.60 | 0.54 | 0.83 | 0.26 | 2.82 | 0.47 | 2.36 | 0.19 |
| ABS | 5.78 | 0.36 | 3.67 | 1.23 | 5.40 | 0.07 | 4.89 | 0.07 |
| PMMA | 2.98 | 0.09 | 1.29 | 0.21 | 3.31 | 0.40 | 2.38 | 0.16 |
| PC | 7.61 | 1.24 | 1.79 | 0.42 | 1.90 | 0.55 | 1.86 | 0.53 |

Table 2 illustrates desirable physical properties (such as in terms of tensile shear strength) across a variety of substrates for the two part cyanoacrylate/(meth)acrylate hybrid adhesive system embodiment of the two-part, cyanoacrylate/free radically curable adhesive system. FIG. 1 shows this data in a bar chart format.

With reference to Table 3, four adhesive systems were prepared where the (meth)acrylate component was chosen in a similar manner to those shown in Table 1. Here, however, the cyanoacrylate component was based on β-methoxy cyanoacrylate (instead of ECA), mixed with t-BPB together with boron trifluoride as a stabilizer.

TABLE 3

Part A

| | | Sample/Amt (grams) | | | |
|---|---|---|---|---|---|
| Type | Identity | A1 | A2 | A3 | A4 |
| (Meth)acrylate | TRIEGMA | 99.0 | — | — | — |
| | HPMA | — | 99.0 | — | — |
| | EBECRYL 1259* | — | — | 99.0 | 44.5 |
| Transitional Metal | $Cu(BF_4)_2 \cdot H_2O$ | 1.0 | 1.0 | 1.0 | 1.0 |

Part B

| | | Sample/Amt (grams) |
|---|---|---|
| Type | Identity | B2 |
| Cyanoacrylate | BMeOCA | 95.0 |
| Peroxide | t-BPB | 5.0 |
| Stabilizer | $BF_3$ | 50 ppm |

With reference to Table 4, each of the four adhesive systems set forth in Table 3 was applied to the noted substrate which was mated in an overlapped, off-set manner with the adhesive system disposed between the substrates in the overlapped, off-set portion, and allowed to cure for 24 hours at room temperature. The tensile shear strength (in MPas) was observed and recorded.

TABLE 4

| | Sample | | | | | | | |
|---|---|---|---|---|---|---|---|---|
| | A1-B2 | | A2-B2 | | A3-B2 | | A4-B2 | |
| Substrate | mean | s.d. | mean | s.d. | mean | s.d. | mean | s.d. |
| Mild Steel | 6.15 | 0.19 | 7.60 | 1.25 | 1.28 | 1.00 | 8.73 | 0.93 |
| Aluminum | 4.20 | 0.82 | 2.84 | 0.53 | 9.46 | 0.77 | 7.54 | 0.50 |
| PVC | 0.75 | 0.11 | 0.39 | 0.09 | 0.4 | 0.28 | 0.75 | 0.08 |
| ABS | 5.90 | 1.12 | 4.10 | 0.82 | 0.87 | 0.11 | 3.44 | 0.29 |
| PMMA | 0.80 | 0.08 | 0.86 | 0.08 | 0.23 | 0.08 | 1.09 | 0.10 |
| PC | 3.19 | 0.29 | 0.95 | 0.10 | 1.38 | 0.02 | 0.62 | 0.18 |

Figure 2:
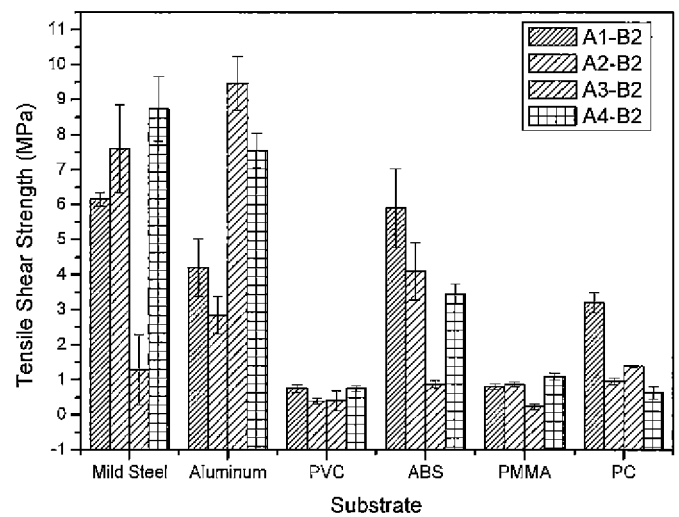

Table 4 illustrates desirable physical properties (such as in terms of tensile shear strength) across a variety of substrates for the two part β-methoxy cyanoacrylate/(meth)acrylate hybrid adhesive system embodiment of the two-part, cyanoacrylate/free radically curable adhesive system. FIG. 2 shows this data in a bar chart format.

With reference to Table 5, three adhesive systems were prepared where the (meth)acrylate component was chosen in a similar manner to those shown in Table 1. Here, however, the cyanoacrylate-containing Part B also contained a thickener.

TABLE 5

Part A

| | | Sample/Amt (grams) |
|---|---|---|
| Type | Identity | A1 |
| (Meth)acrylate | TRIEGMA | 99.0 |
| | HPMA | — |
| | EBECRYL 1259 | — |
| Transitional Metal | $Cu(BF_4)_2 \cdot H_2O$ | 1.0 |

Part B

| | | Sample/Amt (grams) | | |
|---|---|---|---|---|
| Type | Identity | B1 | B3 | B5 |
| Cyanoacrylate | ECA | 95.0 | 85.0 | 85.0 |
| Peroxide | t-BPB | 5.0 | 5.0 | 5.0 |
| Stabilizer | $BF_3$ | 50 ppm | 50 ppm | 50 ppm |
| Thickener | VINNOL 40/60 | — | 10.0 | — |
| | PMMA | — | — | 10.0 |

With reference to Table 6, each of the three adhesive systems set forth in Table 5 was applied to the noted substrate which was mated in an overlapped, off-set manner with the adhesive system disposed between the substrates in the overlapped, off-set portion, and allowed to cure for 24 hours at room temperature. The tensile shear strength (in MPas) was observed and recorded.

TABLE 6

| | Sample | | | | | |
|---|---|---|---|---|---|---|
| | A1-B1 | | A1-B3 | | A1-B5 | |
| Substrate | mean | s.d. | mean | s.d. | mean | s.d. |
| Mild Steel | 6.05 | 0.61 | 5.64 | 0.62 | 6.2 | 0.37 |
| Aluminum | 2.47 | 0.46 | 2.62 | 0.57 | 3.05 | 0.36 |
| PVC | 5.78 | 0.36 | 6.17 | 0.45 | 6.22 | 0.05 |
| ABS | 2.6 | 0.54 | 3.17 | 0.42 | 2.37 | 0.38 |
| PMMA | 2.98 | 0.09 | 3.05 | 0.46 | 2.84 | 0.17 |
| PC | 7.61 | 1.24 | 6.13 | 0.96 | 4.99 | 0.36 |

Figure 3:
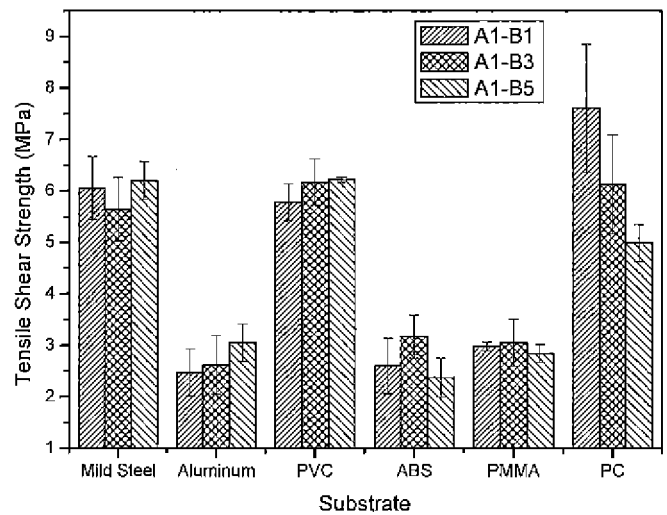

Table 6 illustrates physical properties (such as in terms of tensile shear strength) across a variety of substrates for the two part ethyl cyanoacrylate/(meth)acrylate hybrid adhesive system embodiment of the two-part, cyanoacrylate/free radically curable adhesive system. FIG. 3 shows this data in a bar chart format.

With reference to Table 7, three adhesive systems were prepared where the (meth)acrylate component was chosen in a similar manner to those shown in Table 1. Here, however, the cyanoacrylate-containing Part B was based on β-methoxy cyanoacrylate and also contained a thickener.

TABLE 7

Part A

| | Components | Sample/Amt (grams) |
|---|---|---|
| Type | Identity | A1 |
| (Meth)acrylate | TRIEGMA | 99.0 |
| | HPMA | — |
| | EBECRYL 1259 | |
| Transitional Metal | $Cu(BF_4)_2 \cdot H_2O$ | 1.0 |

Part B

| | Components | Sample/Amt (grams) | | |
|---|---|---|---|---|
| Type | Identity | B2 | B4 | B6 |
| Cyanoacrylate | BMeOCA | 95.0 | 85.0 | 85.0 |
| Peroxide | t-BPB | 5.0 | 5.0 | 5.0 |
| Stabilizer | $BF_3$ | 50 ppm | 50 ppm | 50 ppm |
| Thickener | VINNOL 40/60 | — | 10.0 | — |
| | PMMA | — | — | 10.0 |

With reference to Table 8, each of the three adhesive systems set forth in Table 7 was applied to the noted substrate which was mated in an overlapped, off-set manner with the adhesive system disposed between the substrates in the overlapped, off-set portion, and allowed to cure for 24 hours at room temperature. The tensile shear strength (in MPas) was observed and recorded.

TABLE 8

| | Sample | | | | | |
|---|---|---|---|---|---|---|
| | A1-B2 | | A1-B4 | | A1-B6 | |
| Substrate | mean | s.d. | mean | s.d. | mean | s.d. |
| Mild Steel | 6.15 | 0.19 | 4.97 | 0.39 | 0.26 | 0.19 |
| Aluminum | 4.2 | 0.82 | 3.98 | 0.42 | 0.53 | 0.09 |
| PVC | 5.9 | 1.12 | 6.07 | 0.82 | 6.52 | 0.25 |
| ABS | 0.75 | 0.11 | 0.86 | 0.28 | 0.67 | 0.07 |
| PMMA | 0.8 | 0.08 | 0.94 | 0.11 | 1.42 | 0.19 |
| PC | 3.19 | 0.29 | 3.75 | 0.19 | 3.21 | 0.19 |

Figure 4:
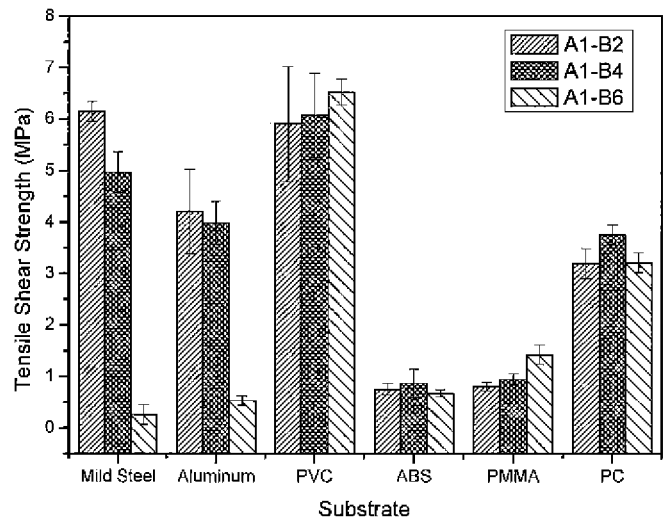

Table 8 illustrates physical properties (such as in terms of tensile shear strength) across a variety of substrates for the two part ethyl cyanoacrylate/(meth)acrylate hybrid adhesive system embodiment of the two-part, cyanoacrylate/free radically curable adhesive system. FIG. 4 shows this data in a bar chart format.

With reference to Table 9, three adhesive systems were prepared where the (meth)acrylate component was based on one or more of TRIEGMA, HPMA, and benzyl methacrylate, mixed with hydrated copper tetrafluorobate and the cyanoacrylate component was based on ECA, mixed with t-BPB together with boron trifluoride as a stabilizer and VINNOL as a thickener.

TABLE 9

Part A

| | Components | Sample/Amt (grams) | | |
|---|---|---|---|---|
| Type | Identity | A1 | A5 | A6 |
| (Meth)acrylate | TRIEGMA | 99.0 | 49.5 | 49.5 |
| | Benzyl Methacrylate | — | 49.5 | — |
| | HPMA | — | — | 49.5 |
| Transitional Metal | $Cu(BF_4)_2 \cdot H_2O$ | 1.0 | 1.0 | 1.0 |

Part B

| | Components | Sample/Amt (grams) |
|---|---|---|
| Type | Identity | B3 |
| Cyanoacrylate | ECA | 85.0 |
| Thickener | VINNOL 40/60 | 10.0 |
| Stabilizer | $BF_3$ | 50 ppm |
| Peroxide | t-BPB | 5.0 |

With reference to Table 10, each of the three adhesive systems set forth in Table 9 was applied to the noted substrate which was mated in an overlapped, off-set manner with the adhesive system disposed between the substrates in the overlapped, off-set portion, and allowed to cure for 24 hours at room temperature. The tensile shear strength (in MPas) was observed and recorded.

TABLE 10

| | Sample | | | | | |
|---|---|---|---|---|---|---|
| | A1-B3 | | A5-B3 | | A6-B3 | |
| Substrate | mean | s.d. | mean | s.d. | mean | s.d. |
| Mild Steel | 6.62 | 0.9 | 8.13 | 1.01 | 8.79 | 1.51 |
| Aluminum | 3.49 | 0.52 | 3.79 | 0.86 | 3.71 | 1.02 |
| PVC | 2.68 | 0.77 | 2.46 | 0.61 | 4.74 | 0.45 |
| ABS | 5.71 | 0.21 | 6.03 | 0.42 | 5.04 | 0.11 |
| PMMA | 2.96 | 0.4 | 3.07 | 0.23 | 3.06 | 0.45 |
| PC | 8.54 | 1.04 | 9.92 | 1.92 | 5.64 | 0.35 |

Figure 5:
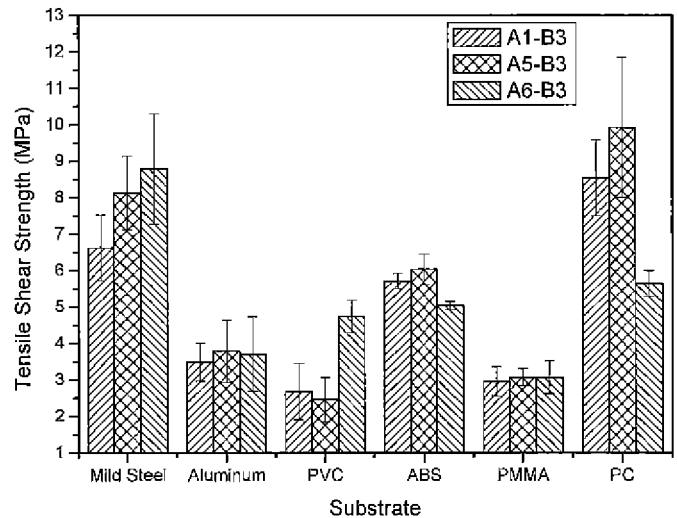

Table 10 illustrates physical properties (such as in terms of tensile shear strength) across a variety of substrates for the two part ethyl cyanoacrylate/(meth)acrylate hybrid adhesive system embodiment of the two-part, cyanoacrylate/free radically curable adhesive system. FIG. 5 shows this data in a bar chart format.

With reference to Table 11, three adhesive systems were prepared where the (meth)acrylate component was based on one or more of TRIEGMA, HPMA, benzyl methacrylate and EBACRYL 1259, mixed with hydrated copper tetrafluorobate and the cyanoacrylate component was based on ECA, mixed with t-BPB together with boron trifluoride as a stabilizer and VINNOL as a thickener.

TABLE 11

Part A

| | Components | Sample/Amt (grams) | | | |
|---|---|---|---|---|---|
| Type | Identity | A3 | A7 | A8 | A9 |
| (Meth)acrylate | EBECRYL 1259 | 99.0 | 74.0 | 74.0 | 74.0 |
| | Benzyl Methacrylate | — | 25.0 | — | — |
| | TRIEGMA | — | — | 25.0 | — |
| | HPMA | — | — | — | 25.0 |
| Transitional Metal | $Cu(BF_4)_2 \cdot H_2O$ | 1.0 | 1.0 | 1.0 | 1.0 |

Part B

| | Components | Sample/Amt (grams) |
|---|---|---|
| Type | Identity | B3 |
| Cyanoacrylate | ECA | 85.0 |
| Thickener | VINNOL 40/60 | 10.0 |

TABLE 11-continued

| Stabilizer | BF₃ | 50 ppm |
|---|---|---|
| Peroxide | t-BPB | 5.0 |

With reference to Table 12, each of the three adhesive systems set forth in Table 11 was applied to the noted substrate which was mated in an overlapped, off-set manner with the adhesive system disposed between the substrates in the overlapped, off-set portion, and allowed to cure for 24 hours at room temperature. The tensile shear strength (in MPas) was observed and recorded.

TABLE 12

| | Sample | | | | | | | |
|---|---|---|---|---|---|---|---|---|
| | A3-B3 | | A7-B3 | | A8-B3 | | A9-B3 | |
| Substrate | mean | s.d. | mean | s.d. | mean | s.d. | mean | s.d. |
| Mild Steel | 23.08 | 2.03 | 21 | 0.97 | 16.84 | 1.55 | 19.14 | 4.07 |
| Aluminum | 8.54 | 1.54 | 9.48 | 0.55 | 8.04 | 1.01 | 8.2 | 0.96 |
| PVC | 4.27 | 2.62 | 3.1 | 1.11 | 2.64 | 1.39 | 2.62 | 1.03 |
| ABS | 4.51 | 1.76 | 4.55 | 1.17 | 5.04 | 0.73 | 5.02 | 0.69 |
| PMMA | 3.43 | 0.71 | 3.04 | 0.16 | 2.87 | 0.2 | 2.77 | 0.09 |
| PC | 2.27 | 0.16 | 1.86 | 0.12 | 2.48 | 0.16 | 1.28 | 0.07 |

Figure 6:
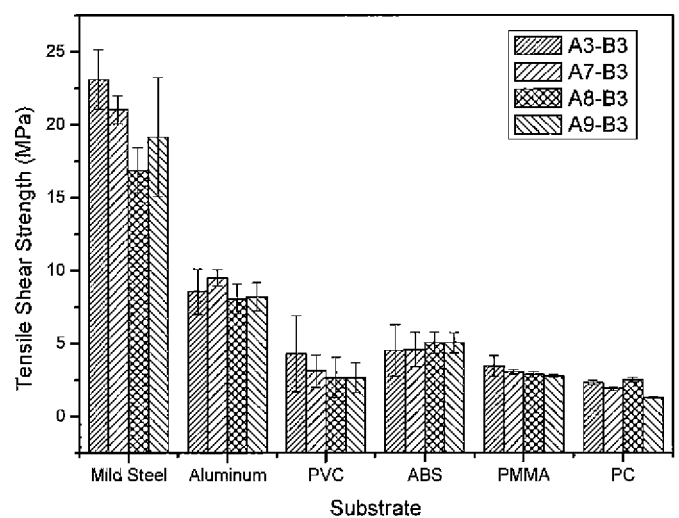

Table 12 illustrates physical properties (such as in terms of tensile shear strength) across a variety of substrates for the two part ethyl cyanoacrylate/(meth)acrylate hybrid adhesive system embodiment of the two-part, cyanoacrylate/free radically curable adhesive system. FIG. 6 shows this data in a bar chart format.

With reference to Table 13, three adhesive systems were prepared where the (meth)acrylate component was chosen in a similar manner to those shown in Table 11, though with HEMA phosphate added. Here, however, the cyanoacrylate-containing Part B was based on ECA, mixed with t-BPB together with boron trifluoride as a stabilizer and VINNOL as a thickener.

TABLE 13

Part A

| | Components | Sample/Amt (grams) | | | |
|---|---|---|---|---|---|
| Type | Identity | A10 | A11 | A12 | A13 |
| (Meth)acrylate | TRIEGMA | — | — | 24.9 | — |
| | HPMA | — | — | — | 24.9 |
| | EBECRYL 1259 | 98.9 | 74.0 | 74.0 | 74.0 |
| | Benzyl Methacrylate | — | 24.9 | — | — |
| Transitional Metal Additive | Cu(BF₄)₂·xH₂O | 1.0 | 1.0 | 1.0 | 1.0 |
| | HEMA Phosphate | 0.1 | 0.1 | 0.1 | 0.1 |

Part B

| | Components | Sample/Amt (grams) |
|---|---|---|
| Type | Identity | B3 |
| Cyanoacrylate | ECA | 85.0 |
| Peroxide | t-BPB | 5.0 |
| Stabilizer | BF₃ | 50 ppm |
| Thickener | VINNOL 40/60 | 10.0 |

With reference to Table 14, each of the three adhesive systems set forth in Table 12 was applied to the noted substrate which was mated in an overlapped, off-set manner with the adhesive system disposed between the substrates in the overlapped, off-set portion, and allowed to cure for 24 hours at room temperature. The tensile shear strength (in MPas) was observed and recorded.

TABLE 14

| | Sample | | | | | | | |
|---|---|---|---|---|---|---|---|---|
| | A10-B3 | | A11-B3 | | A12-B3 | | A13-B3 | |
| Substrate | mean | s.d. | mean | s.d. | mean | s.d. | mean | s.d. |
| Mild Steel | 27.2 | 1.09 | 16.33 | 2.06 | 19.42 | 1.35 | 23.88 | 2.34 |
| Aluminum | 12.13 | 1.32 | 6.2 | 1 | 11.78 | 0.19 | 13.8 | 0.54 |
| PVC | 2.25 | 0.67 | 2.11 | 0.67 | 1.43 | 0.16 | 1.55 | 0.26 |
| ABS | 2.33 | 0.43 | 5.98 | 0.05 | 5.17 | 0.45 | 3.55 | 1.38 |
| PMMA | 2.23 | 0.54 | 2.56 | 0.25 | 2.35 | 0.15 | 2.04 | 0.46 |
| PC | 1.22 | 0.14 | 2.41 | 0.52 | 1.44 | 0.21 | 1.21 | 0.19 |

Figure 7:
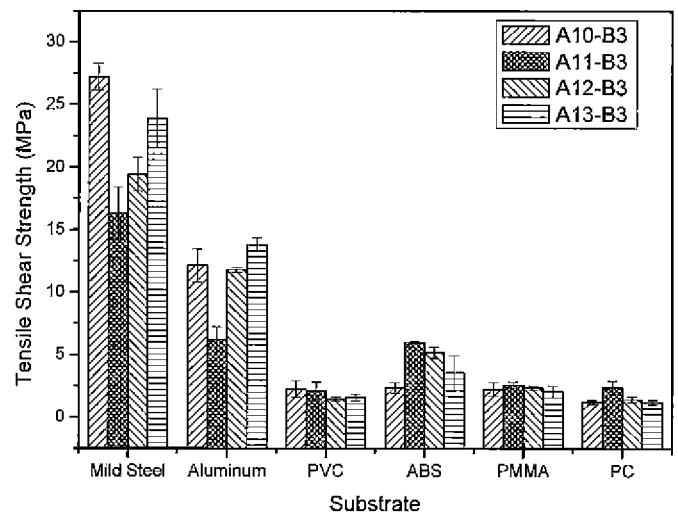

Table 14 illustrates physical properties (such as in terms of tensile shear strength) across a variety of substrates for the two part ethyl cyanoacrylate/(meth)acrylate hybrid adhesive system embodiment of the two-part, cyanoacrylate/free radically curable adhesive system. FIG. 7 shows this data in a bar chart format.

With reference to Table 15, three adhesive systems were prepared where the (meth)acrylate component was chosen in a similar manner to those shown in Table 13, and the cyanoacrylate component was based on ECA, mixed with t-BPB together with boron trifluoride as a stabilizer, VINNOL as a thickener and microparticles.

TABLE 15

Part A

| | Components | Sample/Amt (grams) | | | |
|---|---|---|---|---|---|
| Type | Identity | A10 | A11 | A12 | A13 |
| (Meth)acrylate | TRIEGMA | — | — | 24.9 | — |
| | HPMA | — | — | — | 24.9 |
| | EBECRYL 1259 | 98.9 | 74.0 | 74.0 | 74.0 |
| | Benzyl Methacrylate | — | 24.9 | — | — |
| Transitional Metal Additive | Cu(BF₄)₂·xH₂O | 1.0 | 1.0 | 1.0 | 1.0 |
| | HEMA Phosphate | 0.1 | 0.1 | 0.1 | 0.1 |

Part B

| | Component | Sample/Amt (grams) |
|---|---|---|
| Type | Identity | B7 |
| Cyanoacrylate | ECA | 83.995 |
| Thickener | VINNOL 40/60 | 10.0 |
| Stabilizer | BF₃ | 50 ppm |
| Peroxide | t-BPB | 5.0 |
| Microparticles | UH-1250 | 1.0 |

With reference to Table 16, each of the three adhesive systems set forth in Table 14 was applied to the noted substrate which was mated in an overlapped, off-set manner with the adhesive system disposed between the substrates in the overlapped, off-set portion, and allowed to cure for 24 hours at room temperature. The tensile shear strength (in MPas) was observed and recorded.

TABLE 16

| | Tensile Shear Strength (MPa) | | | | | | | |
|---|---|---|---|---|---|---|---|---|
| | A10-B7 | | A11-B7 | | A12-B7 | | A13-B7 | |
| Substrate | mean | s.d. | mean | s.d. | mean | s.d. | mean | s.d. |
| Mild Steel | 29.26 | 2.05 | 22.22 | 4.41 | 22.72 | 1.18 | 23.1 | 4.69 |
| Aluminum | 15.12 | 1.48 | 7.49 | 0.69 | 11.63 | 0.78 | 16.12 | 1.48 |

TABLE 16-continued

| | Tensile Shear Strength (MPa) | | | | | | | |
|---|---|---|---|---|---|---|---|---|
| | A10-B7 | | A11-B7 | | A12-B7 | | A13-B7 | |
| Substrate | mean | s.d. | mean | s.d. | mean | s.d. | mean | s.d. |
| PVC | 3 | 0.34 | 2.92 | 0.25 | 2.76 | 0.24 | 3.37 | 0.1 |
| ABS | 5.2 | 0.7 | 6.09 | 0.57 | 5.44 | 0.31 | 5.98 | 0.1 |
| PMMA | 2.91 | 0.55 | 3.02 | 0.29 | 2.77 | 0.1 | 2.85 | 0.59 |
| PC | 1.48 | 0.77 | 3.56 | 0.84 | 1.73 | 0.56 | 1.57 | 0.31 |

Figure 8:
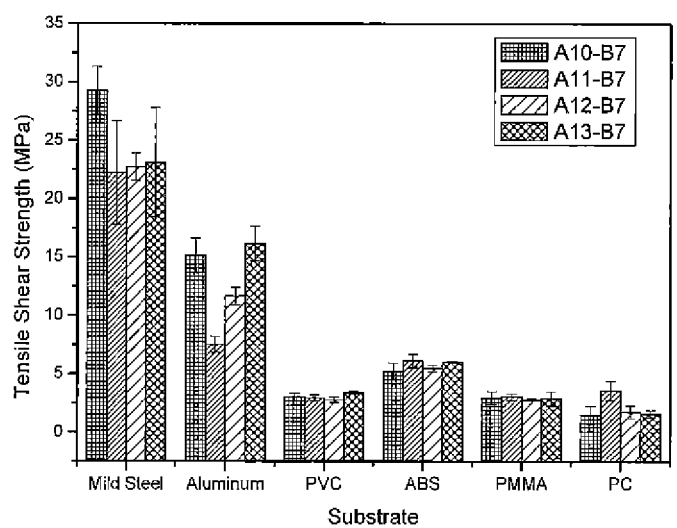

Table 16 illustrates physical properties (such as in terms of tensile shear strength) across a variety of substrates for the two part ethyl cyanoacrylate/(meth)acrylate hybrid adhesive system embodiment of the two-part, cyanoacrylate/free radically curable adhesive system. FIG. 8 shows this data in a bar chart format.

With reference to Table 17, three adhesive systems were prepared where the (meth)acrylate component was based on one or more of POEMA, HEMA and HPMA, mixed with hydrated a vanadium naphthenate (in place of a copper compound) and a toughening agent. The cyanoacrylate component was based on ECA, mixed with t-BPB together with boron trifluoride as a stabilizer, a VAMAC thickener and HEMA phosphoric acid.

With reference to Table 17 below, we prepared a two part adhesive composition using a vanadium compound in place of a copper compound.

TABLE 17

Part A

| Components | | Sample/Amt (grams) |
|---|---|---|
| Type | Identity | A14 |
| (Meth)acrylate | POEMA* | 23.83 |
| | HEMA | 23.83 |
| | HPMA | 23.83 |
| Transitional Metal | Vanadyl Naphthanate (35% in POEMA) | 0.3 |
| Toughening Agent | BLENDEX 338 | 28.21 |

Part B

| Constituent | | Sample/Amt (grams) |
|---|---|---|
| Type | Identity | B8 |
| Cyanoacrylate | ECA | 83.82 |
| Thickener | VAMAC VCS 5500 | 9.40 |
| Stabilizer | BF$_3$ | 2.40 |
| Peroxide | CHP | 2.19 |
| Additive | HEMA Phosphoric acid | 2.19 |

*POEMA = phenoxyethyl methacrylate

The so formed two part adhesive composition was applied to a variety of substrates and allowed to cure between the mated substrates. The shear strength developed is reported below in Table 18.

TABLE 18

| Substrate | Shear Strength [MPa] |
|---|---|
| Mild steel | 19.97 |
| Aluminium | 11.13 |
| PVC | 1.82 |
| PMMA | 4.82 |

TABLE 18-continued

| Substrate | Shear Strength [MPa] |
|---|---|
| ABS | 2.51 |
| PC | 6.38 |

In this example, we prepared a two part adhesive composition using a cobalt compound in place of a copper compound.

TABLE 19

Part A

| Components | | Sample/Amt (grams) |
|---|---|---|
| Type | Identity | A15 |
| (Meth)acrylate | Isobornyl Methacrylate | 15.275 |
| | HPMA | 8.2 |
| | HEMA | 25.6 |
| | Polyurethane oligomer having multi(meth) acrylate functionality* | 50.9 |
| Transitional Metal | Cobalt Naphthanate | 0.025 |

Part B

| Constituent | | Sample/Amt (grams) |
|---|---|---|
| Type | Identity | B9 |
| Cyanoacrylate | ECA | 93.48 |
| Additive | Acrylic acid | 0.93 |
| Stabilizer | BF$_3$ | 4.66 |
| Peroxide | CHP | 0.93 |

*See U.S. Pat. Nos. 3,425,988 (Gorman) and 4,309,526 (Baccei).

TABLE 20

| Substrate | Shear Strength [MPa] |
|---|---|
| Mild Steel | 14.4 |
| Aluminium | 7.73 |
| PVC | 3.80 |
| PMMA | 2.72 |
| ABS | 3.69 |
| PC | 3.13 |

In this example, we varied identity of the copper compound as the transition metal catalyst, though each compound was used in an amount of 2,000 ppm. Table 21 shows the model formulation used to evaluate the various copper compounds, and Table 22 shows the copper compounds together with the performance observed on GEMS and PC substrates.

TABLE 21

Part A

| Components | | Sample/Amt (grams) |
|---|---|---|
| Type | Identity | A16 |
| (Meth)acrylate | EBECRYL 1259 | 77 |
| | TRIEGMA | 11 |
| | Benzyl Methacrylate | 11 |
| Transitional Metal | Copper | 2000 ppm |

TABLE 21-continued

Part B

| Constituent | | Sample/Amt (grams) |
|---|---|---|
| Type | Identity | B10 |
| Cyanoacrylate | ECA | 87.5 |
| Thickener | VAMAC VCS 5500 | 10 |
| Stabilizer | BF$_3$ | 2.50 |
| Peroxide | t-BPB | 5.0 |

TABLE 22

| | Substrate | |
|---|---|---|
| Copper Compound | GBMS | PC |
| Cu (II) acetylacetonate | 26.05 | 1.43 |
| Cu (II) hydroxide phosphate | 8.77 | 0.55 |
| Cu (II) iodide | 8.88 | 0 |
| Cu (II) formate hydrate | 13.15 | 1.19 |
| Cu (II) molybdate | 8.32 | 0.88 |
| Cu (II) 2-ethyl hexanoate | 5.11 | 0.76 |
| Cu (II) fluoride hydrate | 11.17 | 0.91 |
| Cu (II) oxide | 6.34 | 0.66 |
| Cu (II) carbonate basic | 4.29 | 0.83 |
| Cu (II) bis(2,2,6,6-tetramethyl-3,5-heptanedionate) | 27.22 | 1.87 |
| Cu (II) 1-butanethiolate | 19.5 | 1.16 |
| Cu (II) chloride | 28.95 | 3.02 |
| Cu (II) hexafluoro acetylacetonate hydrate | 20.4 | 2.7 |
| Cu (II) trifluoroacetylacetonate | 20.85 | 1.4 |
| Cu (II) bromide | 4.17 | 2.45 |
| Cu (II) tetrafluoroborate | 24.4 | 2.24 |

Table 22 shows that different copper compounds provide different levels of performance for the adhesive systems, which also varies between the choice of substrate—GBMS or PC substrates. The data shown is tensile shear strength in MPas.

With reference to Table 23, each of the listed commercially available adhesive systems was applied to the noted substrate which was mated in an overlapped, off-set manner with the adhesive system disposed between the substrates in the overlapped, off-set portion, and allowed to cure for 24 hours at room temperature. The tensile shear strength was observed and recorded.

TABLE 23

| Adhesive System | Tensile Shear Strength on Noted Substrate/24 Hours @ RT [Nmm$^2$] | | | | |
|---|---|---|---|---|---|
| | GBMS | Al | PVC | ABS | PC |
| 1K CA$^\$$ | 17-24 | 2-11 | 7-16 | 7-9 | 7-9 |
| 1K MA$^+$ | 15-30$^?$ | — | — | — | — |
| 2K MA* | 21.4 | — | 10.2 | — | — |
| 2K CA$^\wedge$ | 21 | 9 | 8 | 8 | 12 |

$^\$$LOCTITE 401 [Ethyl cyanoacrylate (CAS No. 7085-85-0), 60-100%] and cured for 72 hours.
$^+$LOCTITE 330 [Tetrahydrofurfuryl methacrylate (CAS No. 2455-24-5; EINECS No. 219-529-5), 40-50%; Methacrylic acid (CAS No. 79-41-4; EINECS No. 201-204-4), 1-10%; 2-Ethylhexyl methacrylate (CAS No. 688-84-6; 211-708-6), 1-10%; Bisphenol-A epichlorhydrin resin, MW <= 700 (CAS No. 25068-38-6; EINECS No. 500-033-5), 1-5%; 1,3-Butyleneglycol dimethacrylate (CAS No. 1189-08-8; EINECS No. 214-711-0), 1-5%; and Cumene hydroperoxide (CAS No. 80-15-9; EINECS No. 201-254-7), 0.1-1%]
*LOCTITE V5004 [Part A: Benzyl 2-methylacrylate (CAS No. 2495-37-6; EINECS No. 219-674-4), 40-60%; Isobornyl methacrylate (CAS No. 7534-94-3; EINECS No. 231-403-1), 10-20%; Trimethylenediamine (CAS No. 109-76-2; 203-702-7), 1-10%; Tris(nonylphenyl) phosphate (CAS No. 26523-78-4; EINECS No. 247-759-6), >0.1-<1%; and Part B: Methyl methacrylate (CAS No. 80-62-6; EINECS No. 201-297-1), 20-40%; Phenoxyethyl methacrylate (CAS No. 10595-06-9; EINECS No. 234-201-1), 5-15%; Methacrylic acid (CAS No. 79-41-4; 201-204-4), >5-<10%; 1-10%; Tetrahydrofurfuryl methacrylate (CAS No. 2455-24-5; EINECS No. 219-529-5), 1-10%; 2-Hydroxyethyl methacrylate (CAS No. 868-77-9; EINECS No. 212-782-2), 1-10%; Cumene hydroperoxide (CAS No. 80-15-9; EINECS No. 201-254-7), 0.1-<1%; and Tris(nonylphenyl) phosphate (CAS No. 26523-78-4; EINECS No. 247-759-6), >0.1-<1%]
$^\wedge$LOCTITE 3090 [Part A: Ethyl cyanoacrylate (CAS No. 7085-85-0), >80-<100%; and Part B: Activator]
$^?$LOCTITE Activator 7387 applied to one of the two steel substrates to be mated and bonded The products listed in Table 23 are representative adhesive systems offered for sale commercially by Henkel Corporation, and used for the purposes of comparative discussion herein.

LOCTITE 401 is designed for the assembly of difficult-to-bond materials which require uniform stress distribution and strong tension and/or shear strength. The product provides rapid bonding of a wide range of materials, including metals, plastics and elastomers. LOCTITE 401 is also suited for bonding porous materials such as woods, paper, leather and fabric.

LOCTITE 330 is a general purpose, one part acrylic, which is ordinarily used with an activator. Metal, wood, ferrite, ceramic and plastic materials are oftentimes bonded using this product.

LOCTITE V5004 is a structural acrylic adhesive that provides toughness and excellent adhesion to plastics, metals and composites. The cured product is virtually transparent making it well suited for bonding applications requiring clear, invisible glue lines. LOCTITE V5004 has very high shear strength and resistance to peel, fatigue, and impact loads. This product will adhere to a wide variety of surfaces including most structural thermoplastics, thermosets, FRP, stone, ceramics, steel and aluminum. LOCTITE V5004 is useful to, join dissimilar materials.

LOCTITE 3090 is a two component, fast curing, gap filling adhesive with excellent bonding characteristics to a variety of substrates including plastics, rubbers and metals. LOCTITE 3090 is designed for the assembly of parts with varying or undefined bond gaps (up to 5 mm), or for applications where complete cure of excess adhesive is a requirement. The gel consistency prevents adhesive flow even on vertical surfaces. LOCTITE 3090 is also suited for bonding porous materials such as wood, paper, leather and fabric.

Table 23 illustrates lap shear strength development of the adhesive systems across a variety of substrates. The one part cyanoacrylate adhesive system—LOCTITE 401—is based on ethyl cyanoacrylate. Such one part cyanoacrylate adhesives show lower bond strengths to aluminum than to other metal substrates, such as steel. And they do not demonstrate structural properties, such as humidity or thermal aging, as other adhesive systems do, once cured. The two part cyanoacrylate adhesive system—LOCTITE 3090—shows similar performance traits on aluminum substrates and humidity or thermal aging, as the one part cyanoacrylate.

Cyanoacrylates are well known for their ability to bond quickly at room temperature to a wide range of substrates, such as metals and plastics. Two part acrylic adhesive products also bond metals very well at room temperature, but their ability to bond plastic substrates does not match that of cyanoacrylates. Two part acrylic adhesives on the other hand are known for their excellent durability on metal substrates when subjected to harsh environmental conditions such as high temperature, or high temperature plus high humidity. Under such conditions cyanoacrylates do not perform very well, particularly when compared to two part acrylic adhesive products.

In Table 24, a (meth)acrylate-functionalized polyurethane oligomer was used as a major portion of the (meth)acrylate component. Copper fluoroborate was chosen as the transition metal, and HEMA phosphate was used as an additive. The cyanoacrylate component was chosen to include ECA, thickened with VINNOL, as described earlier.

TABLE 24

Part A

| Components | | Sample/Amt (grams) | |
|---|---|---|---|
| Type | Identity | A17 | A18 |
| (Meth) acrylate | Polyurethane oligomer having multi(meth) acrylate functionality* | 60 | 60 |
| | THFMA | 20 | 20 |
| | TRIEGMA | 20 | 20 |
| Additive | HEMA Phosphate | — | 750 ppm |
| Transition Metal | Copper Tetrafluoroborate | 2000 ppm | 2000 ppm |

Part B

| Components | | Sample/Amt (grams) |
|---|---|---|
| Type | Identity | B11 |
| Cyanoacrylate | ECA | 72.00 |
| Stabiliser | BF$_3$ | 30 ppm |
| Thickener | VINNOL 40/60 | 20.0 |
| Peroxide | t-BPB | 5.0 |

*See U.S. Pat. Nos. 3,425,988 (Gorman) and 4,309,526 (Baccei).

TABLE 25

| | Sample | | | |
|---|---|---|---|---|
| | A17-B11 | | A18-B11 | |
| Substrate | Mean | s.d. | Mean | s.d. |
| GBMS | 20.73 | 2.8 | 20.42 | 2.1 |
| Al | 11.24 | 0.9 | 15.91 | 1.1 |
| PC | 5.64 | 1.17 | 7.73 | 2.12 |
| PMMA | SF | | SF | |
| ABS | SF | | SF | |
| PVC | SF | | SF | |

SF = Substrate failure

With reference to Table 25, each of the two adhesive systems was applied to the noted substrate which was mated in an overlapped, off-set manner with the adhesive system disposed between the substrates in the overlapped, off-set portion, and allowed to cure for 24 hours at room temperature. The lap shear strength was observed and recorded on GBMS, Al and PC. Substrate failure was observed for each system, where one of PMMA, ABS or PVC was chosen as the substrate.

In Table 26, like Table 24, a (meth)acrylate-functionalized polyurethane oligomer was used as a major portion of the (meth)acrylate component, though in a lesser amount. Here, however, instead of copper fluoroborate, copper perchlorate was chosen as the transition metal, and either methacrylic acid or SR-708 as an additive. The cyanoacrylate component was BMOECA, thickened with PMMA.

TABLE 26

Part A

| Components | | Sample/Amt (grams) | |
|---|---|---|---|
| Type | Identity | A19 | A20 |
| (Meth) acrylate | Polyurethane oligomer having multi(meth) acrylate functionality* | 33.0 | 21.206 |
| | THFMA | 16.41 | 14.056 |
| | POEMA | 16.41 | — |
| | Benzyl MA | 16.41 | — |
| | TCDDMA | — | 14.056 |
| | IBOMA | — | 21.206 |
| | PEAM 645* | — | 14.056 |
| Toughening Agent | BLENDEX 338 | 16.41 | 14.056 |
| Additive | Methacrylic Acid | 0.2 | — |
| | SR-708+ | — | 0.2 |
| Transitional Metal | Copper Perchlorate | 1.16 | 1.16 |

Part B

| Components | | Sample/Amt (grams) |
|---|---|---|
| Type | Identity | B6 |
| Cyanoacrylate | BMOECA | 85.00 |
| Stabiliser | BF$_3$ | 50 ppm |
| Thickener | PMMA | 10.0 |
| Peroxide | t-BPB | 5.0 |

*See U.S. Pat. Nos. 3,425,988 (Gorman) and 4,309,526 (Baccei).
*Polyester methacrylate/acrylate oligomer commercially available Designer Molecules Inc., San Diego, CA
+SR-708 is a difunctional solid dimethacrylate monomer, reportedly suitable for curing a variety of elastomers with peroxide. It is commercially available from Sartomer Company, Inc., Exton, PA With reference to Table 27, each of the listed adhesive systems from Table 26, together with the commercially available DP-810 from 3M, was applied to the noted substrate which was mated in an overlapped, off-set manner with the adhesive system disposed between the substrates in the overlapped, off-set portion, and allowed to cure for a period of time of 60 seconds at a temperature of 60° C. and then 24 hours at room temperature. The lap shear strength was observed and recorded.

TABLE 27

| | Sample | | | | | |
|---|---|---|---|---|---|---|
| | A19-B6 | | A20-B6 | | 3M DP-810 | |
| Substrate | Mean | s.d. | Mean | s.d. | Mean | s.d. |
| An. Al - an. Al | 20.2 | 3.54 | 18.2 | 2.07 | 8.03 | 5.01 |
| An. Al - PCABS | 16.4 | 1.8 | 11.5 | 1.91 | 1.39 | 0.82 |

TABLE 27-continued

| Substrate | Sample | | | | | |
|---|---|---|---|---|---|---|
| | A19-B6 | | A20-B6 | | 3M DP-810 | |
| | Mean | s.d. | Mean | s.d. | Mean | s.d. |
| An. Al - IXEF | 13.2 | 2.15 | 10.9 | 2.16 | 2.69 | 1.08 |

An or an = anodized
PCABS = blend of polycarbonate and ABS
IXEF = polyarylamide

Figure 9:
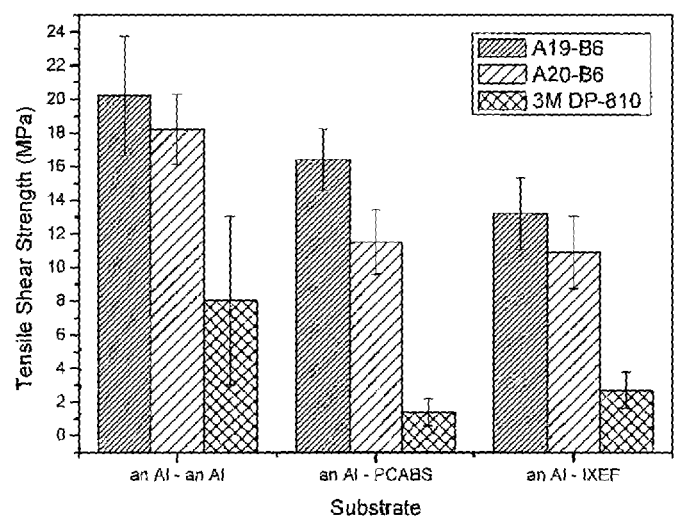

Table 27 illustrates physical properties (such as in terms of tensile shear strength) across a variety of substrates for the two part cyanoacrylate/(meth)acrylate hybrid adhesive system embodiment of the two-part, cyanoacrylate/free radically curable adhesive system. FIG. 9 shows this data in a bar chart format.

What is claimed is:

1. A two part curable composition comprising:
   (a) a first part comprising a cyanoacrylate component and t-butyl perbenzoate as a peroxide catalyst present in an amount from about 0.01% to about 10%, by weight of the cyanoacrylate component; and
   (b) a second part comprising a free radical curable component and a transition metal,
   wherein the cyanoacrylate component comprises $H_2C=C(CN)-COOR$, wherein R is selected from alkyl, alkoxyalkyl, cycloalkyl, alkenyl, aralkyl, aryl, allyl and haloalkyl groups, and wherein when mixed together the peroxide catalyst initiates cure of the free radical curable component and the transition metal initiates cure of the cyanoacrylate component.

2. The composition of claim 1, wherein at least one of the first part or the second part further comprises an organic acid having a $pK_a$ of about 12 or less.

3. The composition of claim 1, wherein the free radical curable component is selected from a (meth)acrylate component, maleimide-, itaconamide- or nadimide-containing compounds, and combinations thereof.

4. The composition of claim 1, wherein the free radical curable component is a (meth)acrylate component selected from the group consisting of polyethylene glycol di(meth)acrylates, tetrahydrofuran (meth)acrylates and di(meth)acrylates, hydroxypropyl (meth)acrylate, hexanediol di(meth)acrylate, trimethylol propane tri(meth)acrylate, diethylene glycol dimethacrylate, triethylene glycol dimethacrylate, benzylmethacrylate, tetraethylene glycol dimethacrylate, dipropylene glycol dimethacrylate, di-(pentamethylene glycol) dimethacrylate, tetraethylene diglycol diacrylate, diglycerol tetramethacrylate, tetramethylene dimethacrylate, ethylene dimethacrylate, neopentyl glycol diacrylate, trimethylol propane triacrylate and bisphenol-A mono and di(meth)acrylates.

5. The composition of claim 1, wherein the transition metal comprises a member selected from the group consisting of copper, vanadium, cobalt and iron.

6. The composition of claim 1, wherein the first part is housed in a first chamber of a dual chamber syringe and the second part is housed in a second chamber of the dual chamber syringe.

7. The composition of claim 1, wherein the second part further comprises at least one of a plasticizer, a filler and a toughener.

8. The composition of claim 6, wherein the toughener is a member selected from the group consisting of (a) reaction products of the combination of ethylene, methyl acrylate and monomers having carboxylic acid cure sites, (b) dipolymers of ethylene and methyl acrylate, (c) combinations of (a) and (b), (4) vinylidene chloride-acrylonitrile copolymers, (5) and vinyl chloride/vinyl acetate copolymer, (6) copolymers of polyethylene and polyvinyl acetate, and combinations thereof.

9. The composition of claim 1, wherein the first part and the second part are present in a ratio of about 1:1 by volume.

10. The composition of claim 1, wherein the first part and the second part are each housed in a separate chamber of a dual chambered container.

11. The composition of claim 2, wherein at least one of the first part or the second part further comprises a member selected from the group consisting of sulfimides, sulfonamides, citric acid, maleic acid, succinic acid, phthalic acid, di-carboxylic acid, maleic dianhydride, succinic anhydride, phthalic anhydride, and combinations thereof.

12. The composition of claim 4, wherein the free radical curable component is a (meth)acrylate component selected from the group consisting of ethoxylated bisphenol-A (meth)acrylate, ethoxylated bisphenol-F (meth)acrylate, methacrylate-functional urethanes, and combinations thereof.

13. The composition of claim 5, wherein the transition metal comprises copper in the form of a member selected from the group consisting of copper (II) 3,5-diisopropylsalicylate hydrate, copper bis(2,2,6,6-tetramethyl-3,5-heptanedionate), copper (II) hydroxide phosphate, copper (II) chloride, copper (II) acetate monohydrate, tetrakis(acetonitrile)copper (I) hexafluorophosphate, copper (II) formate hydrate, tetrakisacetonitrile copper (I) triflate, copper(II)tetrafluoroborate, copper (II) perchlorate, tetrakis(acetonitrile) copper (I) tetrafluoroborate, copper (II) hydroxide, copper (II) hexafluoroacetylacetonate hydrate and copper (II) carbonate.

* * * * *